US011755840B2

(12) United States Patent
Pawar et al.

(10) Patent No.: US 11,755,840 B2
(45) Date of Patent: Sep. 12, 2023

(54) EXTRACTING MENTIONS OF COMPLEX RELATION TYPES FROM DOCUMENTS BY USING JOINT FIRST AND SECOND RNN LAYERS TO DETERMINE SENTENCE SPANS WHICH CORRESPOND TO RELATION MENTIONS

(71) Applicant: Tata Consultancy Services Limited, Mumbai (IN)

(72) Inventors: Sachin Sharad Pawar, Pune (IN); Nitin Ramrakhiyani, Pune (IN); Girish Keshav Palshikar, Pune (IN); Anindita Sinha Banerjee, Pune (IN); Rajiv Srivastava, Pune (IN); Devavrat Shailesh Thosar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 270 days.

(21) Appl. No.: 17/345,281

(22) Filed: Jun. 11, 2021

(65) Prior Publication Data
US 2022/0284192 A1 Sep. 8, 2022

(30) Foreign Application Priority Data
Feb. 9, 2021 (IN) .............................. 202121005474

(51) Int. Cl.
G06F 40/295 (2020.01)
G06F 16/33 (2019.01)
(Continued)

(52) U.S. Cl.
CPC ........ *G06F 40/295* (2020.01); *G06F 16/3344* (2019.01); *G06F 40/205* (2020.01); *G06N 3/049* (2013.01); *G06N 3/08* (2013.01)

(58) Field of Classification Search
CPC .............................. G06N 3/044; G06N 3/045
See application file for complete search history.

(56) References Cited

U.S. PATENT DOCUMENTS

2018/0137404 A1\* 5/2018 Fauceglia .............. G06N 3/044
2018/0157643 A1\* 6/2018 Andrassy ............... G06N 3/045
(Continued)

OTHER PUBLICATIONS

Oshri et al., "There and Back Again: Autoencoders for Textual Reconstruction," Computer Science, 8(5) (2019).
(Continued)

*Primary Examiner* — Farzad Kazeminezhad
(74) *Attorney, Agent, or Firm* — Finnegan, Henderson, Farabow, Garrett & Dunner LLP

(57) ABSTRACT

Extracting data from documents is challenging due to the variation in structure, content, styles across geographies and functional areas. Further complex relation types are characterized by one or more of N-ary entity mention arguments, cross sentence span of entity mentions for a relation mention, missing entity mention arguments and entity mention arguments being multi-valued. The present disclosure addresses these gaps in the art to extract entity mentions and relation mentions using a joint neural network model including two sequence labelling layers which are trained jointly. The mentions are extracted from documents to facilitate downstream processing. A first RNN layer creates sentence embeddings for each sentence in the document being processed and predicts entity mentions. A second RNN layer predicts labels for each sentence span corresponding to a relation type. Using predefined rules, entity mentions for each entity type are selected for extracting relation mentions from the identified sentence spans.

15 Claims, 3 Drawing Sheets

(51) Int. Cl.
  *G06F 40/205* (2020.01)
  *G06N 3/049* (2023.01)
  *G06N 3/08* (2023.01)

(56) References Cited

U.S. PATENT DOCUMENTS

2020/0057807 A1* 2/2020 Kapur .................... G06N 3/045
2020/0311198 A1  10/2020 Poon et al.

OTHER PUBLICATIONS

Zu et al., "Resume information extraction with a novel text block segmentation algorithm," Computer Science, 8(5) (2019).

* cited by examiner

EXTRACTING MENTIONS OF COMPLEX RELATION TYPES FROM DOCUMENTS BY USING JOINT FIRST AND SECOND RNN LAYERS TO DETERMINE SENTENCE SPANS WHICH CORRESPOND TO RELATION MENTIONS

PRIORITY CLAIM

This U.S. patent application claims priority under 35 U.S.C. § 119 to: Indian Patent Application No. 202121005474, filed on 9$^{th}$ Feb. 2021. The entire contents of the aforementioned application are incorporated herein by reference.

TECHNICAL FIELD

The disclosure herein generally relates to the field of text processing, and, more particularly, to systems and methods for extracting mentions of complex relation types from documents.

BACKGROUND

There is an increasing demand for processing text in documents for downstream applications that involve large volume of data. For instance, extracting candidate information in resumes, retrieving specific information from news articles or contract documents are some use cases wherein extraction of certain type of information can facilitate automation of subsequent activities. However, extraction of information has to address the challenges of handling unstructured documents, contents, and other challenges related to differing styles across functional areas. There is also a possibility that some information is missing in the document under consideration. With increasing automation and need to process ever increasing data at a faster rate with accuracy, there is long felt need to be able to extract certain type of information from documents.

SUMMARY

Embodiments of the present disclosure present technological improvements as solutions to one or more of the above-mentioned technical problems recognized by the inventors in conventional systems.

In an aspect, there is provided a processor implemented method comprising the steps of: receiving, via one or more hardware processors, a test document for extracting mentions including a plurality of entity mentions and a plurality of relation mentions using a trained joint neural network model, wherein the trained joint neural network model includes a jointly trained first Recurrent Neural Network (RNN) layer and a second RNN layer, wherein each relation mention in the plurality of relation mentions is a tuple of two or more entity mentions from the plurality of entity mentions; creating, via the one or more hardware processors serving as the first RNN layer, a sentence embedding for each sentence in the test document and predicting the plurality of entity mentions with an associated prediction confidence for each word comprised therein; predicting, via the one or more hardware processors serving as the second RNN layer, labels for each sentence in the test document, wherein the labels identify one or more sentence spans, each sentence span corresponding to a relation type between two or more entity types with associated entity mentions from the predicted plurality of entity mentions; and extracting, via the one or more hardware processors, a relation mention for an associated relation type, from each of the identified one or more sentence spans by selecting at least one entity mention for each entity type corresponding to the relation type.

In another aspect, there is provided a system comprising: one or more data storage devices (102) operatively coupled to one or more hardware processors (104) and configured to store instructions configured for execution via the one or more hardware processors serving at least as a first RNN layer, a second RNN layer, a third RNN layer and a fourth RNN layer, to: receive, a test document for extracting mentions including a plurality of entity mentions and a plurality of relation mentions using a trained joint neural network model, wherein the trained joint neural network model includes the first Recurrent Neural Network (RNN) layer and the second RNN layer trained jointly, wherein each relation mention in the plurality of relation mentions is a tuple of two or more entity mentions from the plurality of entity mentions; create, by the first RNN layer, a sentence embedding for each sentence in the test document and predicting the plurality of entity mentions with an associated prediction confidence for each word comprised therein; predict, by the second RNN layer, labels for each sentence in the test document, wherein the labels identify one or more sentence spans, each sentence span corresponding to a relation type between two or more entity types with associated entity mentions from the predicted plurality of entity mentions; and extract, a relation mention for an associated relation type, from each of the identified one or more sentence spans by selecting at least one entity mention for each entity type corresponding to the relation type.

In yet another aspect, there is provided a computer program product comprising a non-transitory computer readable medium having a computer readable program embodied therein, wherein the computer readable program, when executed on a computing device, causes the computing device to: receive, via one or more hardware processors, a test document for extracting mentions including a plurality of entity mentions and a plurality of relation mentions using a trained joint neural network model, wherein the trained joint neural network model includes a jointly trained first Recurrent Neural Network (RNN) layer and a second RNN layer, wherein each relation mention in the plurality of relation mentions is a tuple of two or more entity mentions from the plurality of entity mentions; create, via the one or more hardware processors serving as the first RNN layer, a sentence embedding for each sentence in the test document and predicting the plurality of entity mentions with an associated prediction confidence for each word comprised therein; predict, via the one or more hardware processors serving as the second RNN layer, labels for each sentence in the test document, wherein the labels identify one or more sentence spans, each sentence span corresponding to a relation type between two or more entity types with associated entity mentions from the predicted plurality of entity mentions; and extract, via the one or more hardware processors, a relation mention for an associated relation type, from each of the identified one or more sentence spans by selecting at least one entity mention for each entity type corresponding to the relation type.

In accordance with an embodiment of the present disclosure, the mentions are associated with complex relation types in the test document characterized by one or more of i) a relation having more than two entity mention arguments, ii) a relation having entity mention arguments spanning across two or more sentences, iii) a relation having one or more missing entity mention arguments for a relation mention, and iv) a relation wherein one or more entity mention arguments have more than one values.

In accordance with an embodiment of the present disclosure, the one or more hardware processors are further configured to extract the relation mention by ignoring a sentence span, from the one or more identified sentence spans, that misses at least one predefined pivot entity mention, wherein each of the at least one predefined pivot entity mention is associated with a predefined pivot entity type and each relation type is associated with at least one predefined pivot entity type.

In accordance with an embodiment of the present disclosure, the one or more hardware processors are further configured to select at least one entity mention for each entity type corresponding to the relation type based on a predefined rule.

In accordance with an embodiment of the present disclosure, the predefined rule is one of (i) selecting an entity mention having a highest prediction confidence if there are more than one associated entity mentions for an entity type and the entity type has a single value; (ii) selecting all the entity mentions if there are more than one associated entity mentions for an entity type and the entity type has multiple values; (iii) selecting an entity mention randomly from the entity mentions of an associated entity type; or (iv) selecting an entity mention having a longest argument from the entity mentions of an associated entity type; and wherein the prediction confidence of an entity mention having multiple words is based on a geometric mean of the prediction confidence of the individual words therein In accordance with an embodiment of the present disclosure, the one or more hardware processors are further configured to train a joint neural network model including the first RNN layer and the second RNN layer to obtain the trained joint neural network model prior to receiving the test document, wherein the training comprises: receiving, a plurality of training documents of the same type as the test document, a list of entity mentions and a list of sentence spans comprised in each of the plurality of training documents, wherein each sentence span corresponds to a relation mention of a relation type between two or more entity types with associated entity mentions; creating, by the first RNN layer, a sentence embedding for each sentence in each of the plurality of training documents, using a sequence of word embeddings of the words comprised therein; and jointly training the first RNN layer and the second RNN layer of the joint neural network model, wherein the first RNN layer is trained using the received list of entity mentions to predict one or more entity mentions with an associated prediction confidence for each word in each sentence, and wherein the second layer is trained using the sentence embeddings created by the first RNN layer and the received list of sentence spans to predict a label for each sentence.

In accordance with an embodiment of the present disclosure, the one or more hardware processors are further configured to combine one or more word embeddings in the sequence of word embeddings with one or more of (i) a Part-of-speech (POS) embedding, (ii) a contextual sentence embedding and (iii) a Named entity recognition (NER) embedding.

In accordance with an embodiment of the present disclosure, the one or more hardware processors are further configured to obtain the contextual sentence embedding by: obtaining, via the third RNN layer, a sentence embedding for each sentence in each of the plurality of training documents, using a sequence of word embeddings of the words comprised therein; and creating, via the fourth RNN layer, a contextual sentence embedding for each obtained sentence embedding from the third layer.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
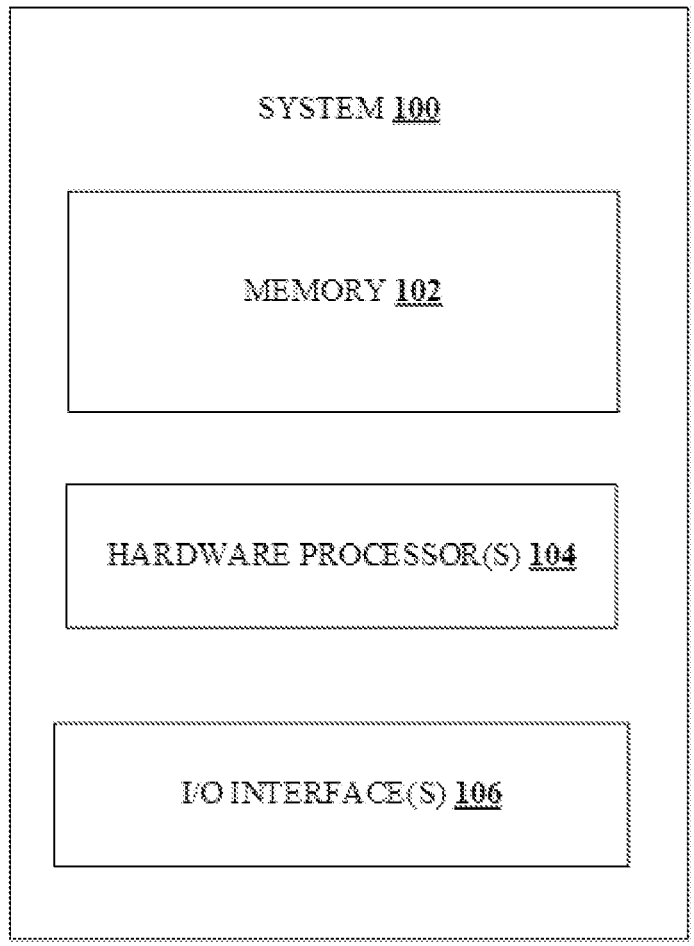
FIG. 1 illustrates an exemplary block diagram of a system for extracting mentions of complex relation types from documents, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Towards automating downstream applications on data extracted from documents, there have been several endeavors in extraction of entity mentions. For instance, resumes play an important role in the recruitment process. There is a lot of information contained in the resumes that may help in short listing the right candidate for a job. The information in the resumes are also important for an employer to identify experts for a particular project, to identify candidates best suited to meet a customer's expectation when it comes to say, number of years of work experience, and the like. News articles can be good source of information for analytics on crime rate, location of crime and other related information if associated data is extracted from large volumes of news related documents.

The technical problem in extracting data from different types of documents relates to the tremendous variation in structure, content, styles across geographies and functional areas (engineering, finance, marketing, human resources, news, etc.). The end goal of the system and method of the present disclosure is to extract specific types of information from documents and store them in a structured repository (e.g. relational tables) for further processing.

A well-known formulation of information in documents is in terms of entities and relations. An entity type refers to a set of real-world objects, and an entity mention refers to a specific instance of that entity type that occurs in a document. For instance, PERSON, ORG, LOCATION, DATE are entity types and Yann LeCun, University of Toronto, Paris and Jul. 8, 1960 are respective mentions of these entity types in a document type—resume. Much of the information in a document type such as a resume may be considered mentions of various entity types: EMPLOYER, DESIGNATION, DEGREE, INSTITUTE, etc. There are several approaches towards entity extraction in the art including Techniques for named entity recognition: A survey by G. K. Palshikar, 2012 in IGI Global or A survey on deep learning for Named Entity Recognition by Li et al. (2020) in IEEE TRANSACTIONS ON KNOWLEDGE AND DATA ENGINEERING. However, entity mention extraction alone may not enable certain analysis. For instance, an Employer may want to identify candidates having a certain no. of years of experience in certain skill sets. Merely extracting associated entity mentions for entity type DURATION and SKILL does not provide as much information as would a relation mention being a tuple of associated entity mentions for the entity types DURATION and SKILL. A relation type defines a specific kind of relationship that may hold between two or more entity types and a relation mention relates the mentions of corresponding entity types in a document. For instance, a relation BORN_IN may hold between entities of type PERSON and LOCATION. Relations serve to model complex and structured facts.

Documents, such as resumes or news articles often include complex relation types characterized by one or more of: i) a relation having more than two entity mention arguments (N-ary), ii) a relation having entity mention arguments spanning across two or more sentences (cross sentence), iii) a relation having one or more missing entity mention arguments for a relation mention (partial), and iv) a relation wherein one or more entity mention arguments have more than one values (multi-valued arguments).

In accordance with the present disclosure, a relation involving two or more entity mention arguments may be referred to as an N-ary relation. Particularly, a relation involving two entity types is referred as a binary relation with N=2 and a ternary relation involves three entity types with N=3. The method and system of the present disclosure is applicable for a relation having N=2. However, the relation is complex when there are more than 2 entities involved. For instance, for a relation type CAREER, a ternary relation indicates that a candidate has worked for an EMPLOYER with a specific DESIGNATION for a specific DURATION. Again, for a relation type EDU (Education), a 4-ary relation indicates a candidate has obtained a DEGREE from an INSTITUTE in a specific YEAR of passing and with specific MARKS. A relation having entity mention arguments spanning across more than one sentence may be referred to as a cross sentence relation which is a characteristic of a complex relation. However, the method and system of the present disclosure is applicable for a relation having entity mention arguments contained within a sentence as well. Partial relation mentions have one or more missing entity mention arguments. For instance, marks may be missing in a 4-ary relation EDU. Further, an entity mention argument may be multi-valued, for e.g. an entity type SKILLS may have multiple values such as JAVA™, SQL™, and the like.

For ease of explanation, the method and system of the present disclosure refers particularly to a document type—resume. However, it may be understood by those skilled in the art that the method and system of the present disclosure may be applied on any document and relation type that satisfies the following conditions:

A single relation mention is expressed across consecutive sentences, i.e., all the entity mention arguments for that relation mention occur within the span of consecutive sentences.

Two relation mentions of the same relation type do not have overlapping sentences associated with it. In other words, a sentence can be part of at most one relation mention of a particular relation type at a time. Although, a sentence can be part of two different relation mentions provided the relation mentions are of different types. E.g., a sentence in a resume cannot be part of two different CAREER relation mentions, but it can be part of one CAREER relation mention and also one PROJECT relation mention.

In a span of consecutive sentences corresponding to a relation mention of a certain relation type, any entity mentions of entity types involved with the relation type which are not part of the relation mention should not occur.

In the context of the present disclosure, the expressions 'representation' and 'embedding' may be used interchangeably.

Figure 2:
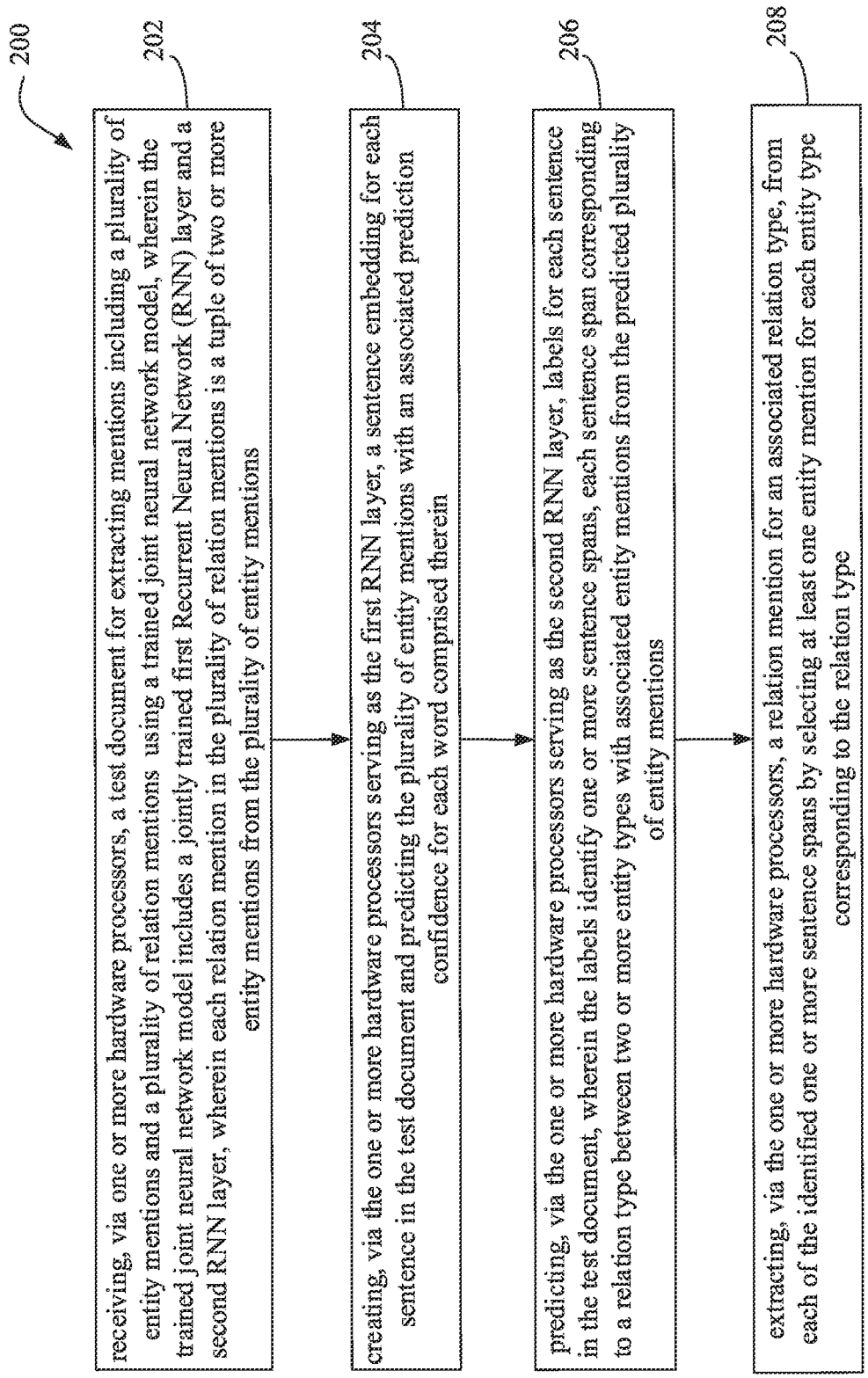
FIG. 2 illustrates an exemplary flow diagram of a computer implemented method for extracting mentions of complex relation types from documents, in accordance with some embodiments of the present disclosure.
Figure 3:
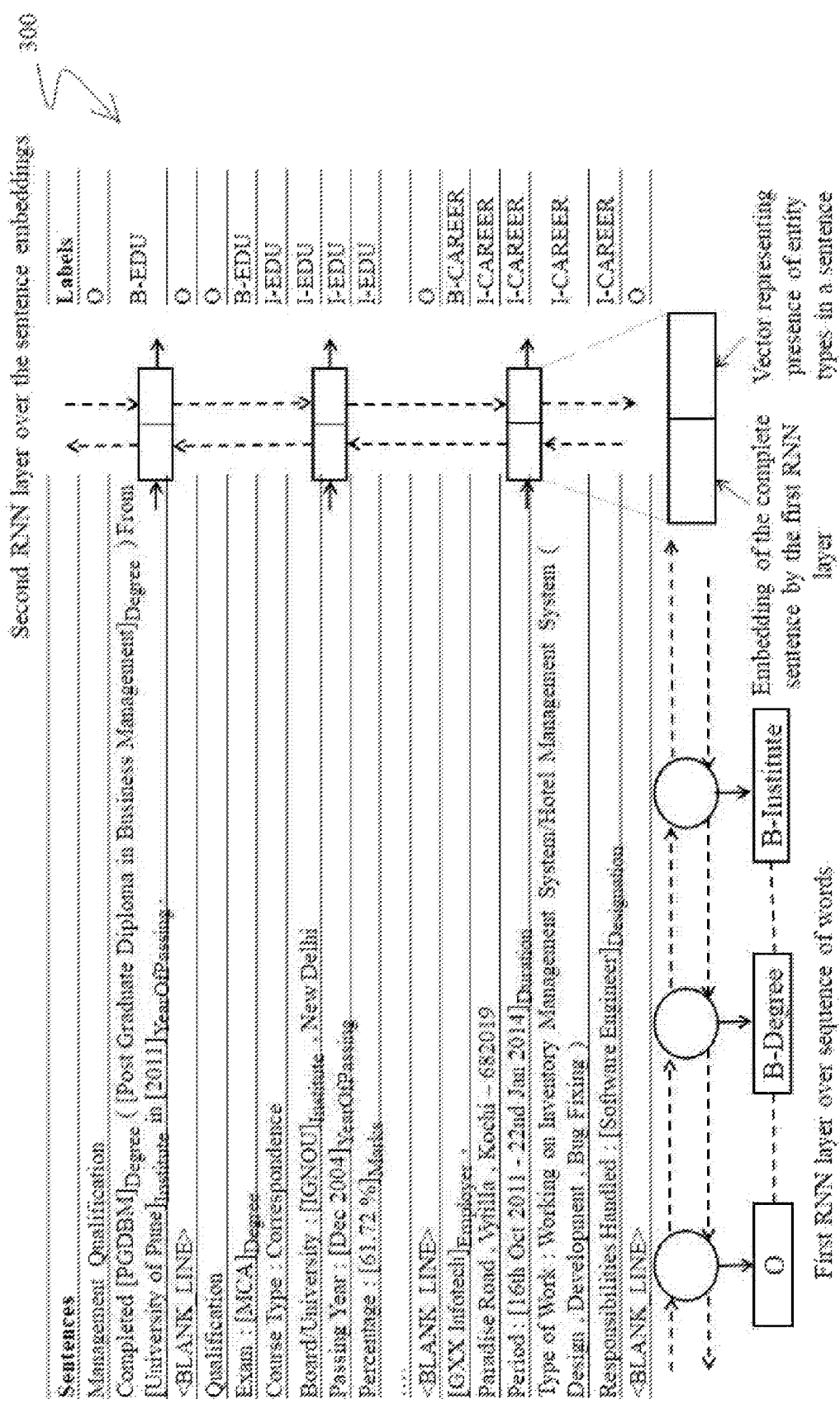
FIG. 3 illustrates an architecture for the system for extracting mentions of complex relation types from documents, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary block diagram of a system 100 for extracting mentions of complex relation types from documents, in accordance with some embodiments of the present disclosure. In an embodiment, the system 100 includes one or more hardware processors 104, communication interface device(s) or input/output (I/O) interface(s) 106, and one or more data storage devices or memory 102 operatively coupled to the one or more hardware processors 104. The one or more hardware processors 104 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2 illustrates an exemplary flow diagram of a computer implemented method 200 for extracting mentions of complex relation types from documents while FIG. 3 illustrates an architecture 300 for the system for extracting mentions of complex relation types from documents, in accordance with some embodiments of the present disclosure. In an embodiment, the system 100 includes one or more data storage devices or memory 102 operatively coupled to the one or more hardware processors 104 and is configured to store instructions configured for execution of steps of the method 200 by the one or more hardware processors 104. In an embodiment, the one or more hardware processors serve at least as a first RNN layer, a second RNN layer, a third RNN layer and a fourth RNN layer as described hereinafter. The steps of the method 200 will now be explained in detail with reference to the components of the system 100 of FIG. 1 and the architecture 300 illustrated in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Accordingly, in an embodiment of the present disclosure, the one or more hardware processors 104, are configured to receive, at step 202, a test document for extracting mentions including a plurality of entity mentions and a plurality of relation mentions using a trained joint neural network model, wherein the trained joint neural network model includes a jointly trained first Recurrent Neural Network (RNN) layer and a second RNN layer, wherein each relation mention in the plurality of relation mentions is a tuple of two or more entity mentions from the plurality of entity mentions. In an embodiment, the mentions may be associated with complex relation types characterized by more than two entity mention arguments, entity mention arguments spanning across two or more sentences, presence of partial entity mention arguments, presence of multi-valued arguments or a combination of these characteristics.

In accordance with the present disclosure, the first RNN layer of the joint neural network model is a model that learns a representation (used interchangeably as embedding) of a sequence and may be one of a Bidirectional Long Short Term Memory (BiLSTM) layer, a BiLSTM with Conditional Random Fields (BiLSTM-CRF) layer, a Bi-directional Gated Recurrent Unit (BiGRU) sequence neural network, a BiGRU-CRF layer, an LSTM layer, a GRU layer, an LSTM-CRF layer, a GRU-CRF layer, and the like. In another embodiment the first RNN layer may be an encoder layer of an autoencoder such as the BiLSTM or BiGRU. Alternatively, the capabilities of the first layer of the joint neural network model may be implemented by $E_{rules}$, a linguistic rules-based approach or $E_{CRF}$, a traditional CRF-based entity extraction approach. In accordance with an embodiment of the present disclosure, the second RNN layer of the joint neural network model maybe one of a BiLSTM-CRF, a BiGRU-CRF layer, an LSTM layer, a GRU layer, an LSTM-CRF layer, a GRU-CRF layer, and the like.

In accordance with an embodiment of the present disclosure, the step 202 of receiving a test document is preceded by training a joint neural network model including the first RNN layer and the second RNN layer to obtain the trained joint neural network model. For training the joint neural network model, a plurality of training documents of the same type as the test document are received along with a list of entity mentions and a list of sentence spans comprised in each of the plurality of training documents, wherein each sentence span corresponds to a relation mention of a relation type between two or more entity types with associated entity mentions.

Table 1: Examples of relation mentions of the relation types EDUCATION (Entity types: Degree, Marks, Institute, YearOfPassing) and CAREER (Entity types: Employer, Duration, Designation), occurring in a document type—resume

| Relation Type | Relation mention |
| --- | --- |
| EDUCATION | <MCA, 61.72%, IGNOU, December 2004> |
| EDUCATION | <Post Graduate Diploma in Business Management, NA, University of Pune, 2011> |
| CAREER | <GXX Infotech, $16^{th}$ Oct. 2011-$22^{nd}$ Jan. 2014, Software Engineer> |

The first RNN layer then creates a sentence embedding for each sentence in each of the plurality of training documents, using a sequence of word embeddings of the words comprised in each sentence. In an embodiment of the present disclosure, one or more word embeddings in the sequence of word embeddings, is combined with one or more of (i) a Part-of-speech (POS) embedding, (ii) a contextual sentence embedding and (iii) a Named entity recognition (NER) embedding to enrich an associated word embedding. The step of combining may involve adding the embeddings in which case the vectors are required to be of the same dimension. Alternatively, the step of combining may involve concatenating the different vectors.

In an embodiment, the POS embedding or the NER embedding may be obtained using tools such as spaCy. POS tag and NER tag are obtained for each word in a sentence. For instance, for a sentence, "I worked with GXX Infotech for 5.4 years.", the POS and NER output is as provided below:
POS Tags:
I/PRP worked/VBD with/IN GXX/NNP Infotech/NNP for/IN 5.4/CD years/NNS./.
NER Tags:
I/O worked/O with/O GXX/ORG Infotech/ORG for/O 5.4/DATE years/DATE./.
The description of the tags is as provided below:
PRP: Personal pronoun
VBD: Verb, past tense
IN: Preposition or subordinating conjunction
NNP: Proper noun, singular
CD: Cardinal number
NNS: Noun, plural
ORG: Companies, agencies, institutions, etc.
DATE: Absolute or relative dates or periods.
O: Outside an entity mention, other word In accordance with the present disclosure, enriching the word embeddings with additional tags provides a fall back option when the word embedding of a word is missing. For instance, in the example provided above, if the word embedding (from a pretrained model such as word2vec, GloVe, and the like) was not available for GXX, the NER tag indicates the missing word embedding (for GXX) is be name of an organization. Again, the tags for the word Infotech is as given below:
POS: Infotech/NNP
NER: Infotech/ORG, thereby providing an additional information that Infotech is an organization.

In accordance with an embodiment of the present disclosure, the contextual sentence embedding enriches the word embedding with information related to the position of the word in the document and provides a document level context to the word embeddings. Towards that, in accordance with the present disclosure, a third RNN layer and a fourth RNN layer are utilized, wherein the third RNN layer is similar to the first RNN layer, and the fourth RNN layer is similar to the second RNN layer. Accordingly, the third RNN layer provides a sentence embedding for each sentence in each of the plurality of training documents, using a sequence of word embeddings of the words comprised in the sentence. The fourth RNN layer receives the sentence embedding from the third layer to create the contextual sentence embedding which is then combined with the word embedding of the words in an associated sentence to enrich the word embedding. In an embodiment, the step of combining may be adding or concatenating of the associated vectors.

In accordance with the present disclosure, once the sentence embeddings are created by the first RNN layer for each sentence in each of the plurality of training documents, the first RNN layer and the second RNN layer of the joint neural network model are trained jointly. The first RNN layer is trained using the received list of entity mentions to predict one or more entity mentions with an associated prediction confidence for each word in each sentence, while the second RNN layer is trained using the sentence embeddings created by the first RNN layer and the received list of sentence spans to predict a label for each sentence. The trained joint neural network model is then used in an inference phase for extracting mentions from the test document received at step 202.

In an embodiment of the present disclosure, the first RNN layer creates at step 204, a sentence embedding for each sentence in the test document and predicts the plurality of entity mentions with an associated prediction confidence for each word comprised therein. It may be understood that although every word is labeled, only some of the labels are associated with an entity type and qualify as entity mentions.

In an embodiment of the present disclosure, the second RNN layer predicts labels, at step 206, for each sentence in the test document, wherein the labels identify one or more sentence spans, each sentence span corresponding to a relation type between two or more entity types with associated entity mentions from the predicted plurality of entity mentions.

In an embodiment of the present disclosure, the one or more hardware processors 104, are configured to extract, at step 208, a relation mention for an associated relation type, from each of the identified one or more sentence spans by selecting at least one entity mention for each entity type corresponding to the relation type. In accordance with the present disclosure, the extracted relation mention is a tuple of two or more entity mentions from the predicted plurality of entity mentions, that map to the associated two or more entity types.

In accordance with the present disclosure, each relation type is associated with at least one predefined pivot entity type. For instance, for a relation type CAREER, EMPLOYER maybe predefined as a pivot entity type. Alternatively, both EMPLOYER and DURATION of employment may be defined as a pivot entity type. In an embodiment, the step 208 of extracting a relation mention ignores a sentence span from the identified one or more identified sentence spans that does not include at least one predefined pivot entity mention associated with the at least one predefined pivot entity type. Accordingly, in an example, for a relation type EDUCATION, DEGREE maybe predefined as a pivot entity type. In the absence of the entity mention for the entity type MARKS, the step 208 of extracting the relation mention proceeds further, whereas in the absence of the entity mention for the entity type DEGREE, the sentence span is ignored.

In accordance with an embodiment of the present disclosure, as part of the step 208 of extracting relation mention, selecting at least one entity mention for each entity type corresponding to the relation type is based on a predefined rule. In accordance with the present disclosure, the predefined rule may be one of:
  (i) selecting an entity mention having a highest prediction confidence if there are more than one associated entity mentions for an entity type and the entity type has a single value;
  (ii) selecting all the entity mentions if there are more than one associated entity mentions for an entity type and the entity type has multiple values (e.g. JAVA™ and SQL™ for entity type SKILL);
  (iii) selecting an entity mention randomly from the entity mentions of an associated entity type; or
  (iv) selecting an entity mention having a longest argument from the entity mentions of an associated entity type; and wherein the prediction confidence of an entity mention having multiple words is based on a geometric mean of the prediction confidence of the individual words therein.

The prediction confidence for each word in each sentence is obtained from the first RNN layer. Selection of entity mentions for entity types having a single value only are required to be based on the prediction confidence. For instance, for a relation type EDUCATION, DEGREE is an entity type that is single valued. A relation mention can have only one entity mention related to the entity type DEGREE. Two degrees (e.g. B.Tech and M.Tech) are parts of two different relation mentions. Further, an example of entity mention having multiple words is Tata Consultancy Services for entity type EMPLOYER which may be tagged using the BIO encoding as Tata/B-EMPLOYER, Consultancy/I-EMPLOYER, Services/I-EMPLOYER. In this case, the prediction confidence of the entity mention Tata Consultancy Services is a geometric mean of the prediction confidence of the individual words.

The problem of extracting mentions may be represented as follows:
INPUT: Test document (e.g. resume) $X^{test}$
OUTPUT: List of entity mentions and relation mentions extracted from $X^{test}$
TRAINING PHASE: n training documents
$\{\langle X_1^{train}, L_{h_1}, L_{v_1}\rangle, \ldots, \langle X_n^{train}, L_{h_n}, L_{v_n}\rangle\}$
$L_{h_i}$ are word-level labels using BIO encoding (Beginning, Inside, Outside), e.g. (B-Employer, B-Degree, I-Degree, O) for each word in each sentence in $X_i^{train}$. The list of entity mentions received in the training phase is used to derive the word-levels using the BIO encoding. $L_{v_i}$ are the sentence-level labels (e.g. B-CAREER, B-EDUCATION, I-EDUCATION, O) for each sentence in $X_i^{train}$ (Refer FIG. 3). The word-level labels capture the information about entity mentions, whereas the sentence-level labels capture the information about sentence spans where each span of consecutive sentences cover a single relation mention (tuple).

In an embodiment, each word in each sentence in the document may be represented as a $d_w+d_p+d_e$ dimensional vector which is a concatenation of $d_w$-dim pre-trained word vector ($x_w$), $d_p$-dim POS tag embedding of the word ($x_P$) and $d_e$-dim NER tag embedding of the word ($x_e$). As mentioned above, tools such as spaCy may be used for POS and NER tagging, GloVe or word2vec may be used for obtaining word embeddings. Embeddings for each distinct POS tag and for each distinct NER tag are initialized to random vectors. These are updated during the training process as any other parameters in the neural network model through backpropagation. Hence an overall representation of each word: $x=[x_w; w_p; x_e]$.

In an embodiment, a complete document, such as a resume may be represented as $X \in \mathbb{R}^{M \times N \times d}$ where $d=d_w+d_p+d_e$ is the overall dimension of word representation, N is the maximum number of words in a sentence in the document and M is the number of sentences in the document.

Let $L_h \in \mathbb{N}^{M \times N}$ and $L_v \in \mathbb{N}^M$ represent the gold standard labels for words (for identifying entity mentions) and sentences (for identifying sentence labels), respectively. Each sentence in the document is passed through the first RNN layer represented by equation (1) below.

$$H_w, H_s = \text{BiLSTM}_h(X) \rightarrow \quad (1)$$

where $H_w \in \mathbb{R}^{M \times N \times 2d_h}$ and $H_s \in \mathbb{R}^{M \times 2d_h}$ represent context representation for each word and each sentence by the first RNN layer, respectively. $d_h$ is the size of a hidden representation.

In an embodiment, each word representation may be passed through a feed-forward neural network layer as represented by equation (2) below.

$$\acute{H}_w = \text{FeedForward}_h(H_w) \rightarrow \quad (2)$$

where $\acute{H}_w \in \mathbb{R}^{M \times N \times n_E}$ and $n_E$ is the number of distinct entity labels.

Equations (2) through (4) represent word-level loss computation for the first RNN layer using the gold-standard entity labels—i) negative log likelihood of whole label sequence using CRF layer for each sentence and ii) cross entropy loss for label predictions at each word in each sentence. Both the losses are averaged over the number of words in the document.

$$l_{word-seq}{}^h = \text{CRF}_{viterbi}{}^h(\text{ReLU}(\acute{H}_w), L_h) \rightarrow \quad (3)$$

$$l_{per-word}{}^h = \text{CrossEntropy}(\text{Softmax}(\acute{H}_w), L_h) \rightarrow \quad (4)$$

To capture the entity types which are being predicted for each sentence, max-pooling is applied over its word-level predictions. Equation (5) below is used to enrich the sentence embedding received from the first RNN layer by combining information (flags 0,1) about entity types (a flag per entity type) being predicted in that sentence. Flag 1 indicates presence of an entity type while flag 0 indicates absence of an entity type. The flags are obtained by a fifth layer being a feed-forward layer using equation (2) and equation (5)

$$H_E = \text{MaxPool}(\text{Softmax}(\acute{H}_w)) \rightarrow \quad (5)$$

Here, $H_E \in \mathbb{R}^{M \times n_E}$ has values close to 1 corresponding to the entity types which are being predicted for at least one word in the sentence and Softmax provides probability distribution over the labels. Now, each sentence is represented by concatenating the representation given by the first RNN layer $(H_s)$ and $H_E$ and then fed to the second RNN layer represented by equation (6).

$$\acute{H}_s = \text{BiLSTM}_v([H_s; H_E]) \rightarrow \quad (6)$$

$\acute{H}_s \in \mathbb{R}^{M \times 2d_v}$ represents context representation for each sentence as outputted by the second RNN layer. $d_v$ is the size of a hidden representation. In an embodiment, each sentence representation may be passed through a feed-forward neural network layer represented by equation (7) below.

$$H'_s = \text{FeedForward}_h(\acute{H}_s) \rightarrow \quad (7)$$

Equations (7) thro (9) represent computation of two losses for sentence-level predictions at the second RNN layer using the gold-standard sentence labels—i) negative log likelihood of whole label sequence using CRF layer for entire resume, and ii) cross-entropy loss for label predictions at each sentence in the resume. Both the losses are averaged over the number of sentences in the document.

$$l_{sent-seq}{}^v = \text{CRF}_{viterbi}{}^v(\text{ReLU}(H''_s), L_v) \rightarrow \quad (8)$$

$$l_{per-sent}{}^v = \text{CrossEntropy}(\text{Softmax}(H''_s), L_v) \rightarrow \quad (9)$$

In an embodiment, wherein the first RNN layer may be an encoder layer of an autoencoder such as the BiLSTM or BiGRU, a reconstruction loss using a sequence autoencoder is considered. The decoder layer accepts the sentence embedding outputted by the encoder layer $H_s$ as input for each time step and tries to reconstruct the original word representations.

$$\acute{X} = \text{LSTM}_{decoder}(H_s^e) \rightarrow \quad (10)$$

where $H_s^e \in \mathbb{R}^{M \times N \times 2d_h}$ is an expanded view of $H_s$ (representation of each sentence is copied N times) and $\acute{X} \in \mathbb{R}^{M \times N \times d}$ contains the reconstructed word representation as outputted by the decoder layer. The reconstruction loss is computed using Mean Square Error (MSE) averaged over the number of words in the document as represented by equation (11) below.

$$l_{AE} = \text{MSE}(\acute{X}, X) \rightarrow \quad (11)$$

In an embodiment, the total loss for the joint neural network model is sum of all the individual loss as represented in equation (12) below.

$$l_{total} = l_{AE} + l_{word-seq}{}^h + l_{per-word}{}^h + l_{sent-seq}{}^v + l_{per-sent}{}^v \rightarrow \quad (12)$$

During the training process, in an embodiment, only the autoencoder component may be trained to optimize $l_{AE}$ on a large corpus of sentences in a plurality of training documents. In an embodiment, 241,132 sentences in 2248 resumes were used as this does not require an annotated dataset. Then the first RNN layer is trained to optimize for $l_{AE} + l_{word-seq}{}^h + l_{per-word}{}^h$ on a subset of the documents. In an embodiment, 1060 resumes annotated with entity labels were used. Finally, the complete joint neural network model is trained to optimize for $l_{total}$ using a subset of the documents which are annotated with both entity as well as sentence labels. In an embodiment, 642 resumes annotated with both entity as well as sentence labels were used. In an alternate embodiment, the subset of 642 resumes may be directly used for training the joint neural network model.

During the inference phase, the test document $X^{test}$ is passed through the trained joint neural network model and the per-word entity labels are obtained using the first RNN layer based on Viterbi decoding. Also, the per-sentence sentence span labels are obtained using the second RNN layer based on Viterbi decoding. Using the sentence-level labels, the sentence spans for each relation type are identified. A relation mention of a relation type is formed for each sentence span for that type.

The system and method of the present disclosure may be implemented in an alternative manner referred hereinafter as the Pipeline model, wherein instead of jointly training the two sequence labelling layers, they are trained sequentially. The first RNN layer is trained to learn an entity extractor. Then the second RNN layer is trained to learn a sentence label identifier. For the second RNN layer, the input sentence representation is created in a similar manner as the joint neural network model. The only different is that the part of the sentence embedding which represents the presence of entity types in a sentence $H_E$ is created using predicted entity mentions obtained from the entity extracted realized by the first RNN layer.

Experimental Analysis

Dataset: 2248 resumes were used for training a sequence autoencoder, 1060 resumes for training a $E_{CRF}$ and pre-training of a BiLSTM-CRF layer (first RNN layer) in the joint neural network model, and 642 resumes for training the complete joint model for jointly identifying entity mentions and sentence spans. The method of the present disclosure was evaluated on a dataset of 175 resumes containing 648 and 597 gold-standard relation mentions of CAREER and EDU (representing EDUCATION), respectively.

Evaluation: Any gold-standard relation mention of type r is counted as a true positive if there is a "matching" predicted relation mention of type r, otherwise it is counted as a false negative for type r. Here, two relation mentions are considered
to be "matching" only if ALL (strict evaluation) of their corresponding entity mention arguments are matching with at least 80% string similarity between them. All the remaining predicted relation mentions of type r which are not true positives, are counted as false positives for r.

Baseline method: A rule-based baseline approach for extracting relation mentions of CAREER and EDU was implemented. This approach assumes that entity mentions have been already extracted. The ensemble of 3 entity extractors—only horizontal BiLSTM-CRF layers of the joint neural network model, $E_{rules}$ and $E_{CRF}$ are used. This approach starts from an entity mention which is a pivot entity argument for a relation type and then attaches entity mentions of other entity arguments in the vicinity (±4 sentences) to construct a relation mention. However, there are several constraints and exceptions incorporated in this attachment decision. Similar to an expert system, this effort-intensive approach has been developed over time by incorporating several human observations regarding how career and education details are mentioned in resumes.

Results and Analysis: Table 2 depicts the performance of the joint neural network model as compared to the baseline, for the test dataset of 175 resumes.

EDU, the pipeline model achieves the highest F1-score whereas for CAREER, the joint model achieves the highest F1-score.

Table 2 also shows that the two independent entity extraction techniques $E_{rules}$ and $E_{CRF}$ help in improving the F1-score. This highlights the importance of traditional features-based machine learning, linguistic rules and gazetteers as well as their complementary contribution to deep learning-based technique for a real-life domain-specific Information Extraction system.

In accordance with the present disclosure, drift in content and style of resumes has been handled by employing an iterative deployment based on revised models through active learning. E.g., in a deployment cycle, the joint model trained on 542 resumes was used. While this model was in use, an uncertainty score was generated for each resume which was processed, using uncertainty sampling based active learning (Settles and Craven, 2008). After a month of deployment, 100 resumes with the highest uncertainty scores were chosen from the thousands of resumes which were processed. Human annotators then provided the correct entity and section labels for these resumes and a new joint model was re-trained on 642 resumes. The improvements of 2.2 and 0.9 in F1-scores of EDU and CAREER relation mentions respectively were observed on the test dataset of 175 resumes. On similar lines, the sequence autoencoder is retrained by adding the new resumes periodically.

Unlike existing N-ary cross-sentence relation extraction techniques such as (Peng et al., 2017), the method and system of the present disclosure does not rely on availability of gold standard entity mentions. In a real-life scenario, predicted entity mentions are relied upon and hence the method and system of the present disclosure handles possible noise in the predicted entity mentions. It was observed that the method and system of the present disclosure was tolerant to some of the errors in entity extraction. E.g., even if an entity mention is a false positive, it does not lead to a false positive relation mention unless the second RNN layer identifies the corresponding sentence as a part of a sentence span constituting a relation mention. Hence the joint neural network model was trained on a dataset where for a subset of resumes, predicted entity labels were used rather than

TABLE 2

Relation extraction performance on the test dataset of 175 resumes (averaged over 3 runs)

| | EDU | | | CAREER | | | Overall |
|---|---|---|---|---|---|---|---|
| | Precision | Recall | F1 | Precision | Recall | F1 | Macro-F1 |
| Baseline | 0.633 | 0.566 | 0.598 | 0.520 | 0.511 | 0.516 | 0.557 |
| Baseline without $E_{rules}$ and $E_{CRF}$ | 0.612 | 0.514 | 0.559 | 0.569 | 0.444 | 0.499 | 0.529 |
| Pipeline model | 0.707 | 0.672 | 0.689 | 0.673 | 0.582 | 0.624 | 0.657 |
| Pipeline model without $E_{rules}$ and $E_{CRF}$ | 0.620 | 0.533 | 0.573 | 0.622 | 0.478 | 0.541 | 0557 |
| Joint model | 0.714 | 0.656 | 0.684 | 0.706 | 0.585 | 0.640 | 0.662 |
| Joint model without $E_{rules}$ | 0.708 | 0.62 | 0.661 | 0.693 | 0.542 | 0.608 | 0.635 |
| Joint model without $E_{CRF}$ | 0.709 | 0.648 | 0.677 | 0.695 | 0.556 | 0.618 | 0.648 |
| Joint model without $E_{rules}$ and $E_{CRF}$ | 0.648 | 0.533 | 0.585 | 0.641 | 0.442 | 0.522 | 0.554 |

It was observed that the joint model and its variant the pipeline model, bath perform considerably better than the baseline, achieving almost 10% higher macro-F1 score. For gold standard entity labels. This made the joint model more tolerant towards any possible errors in entity extraction during inference.

In a preferred embodiment, BiLSTM layer along with pre-trained GloVe word embeddings was used in comparison to transformers-based models like BERT (Develin et al., 2018) for encoding sentences. BiLSTM based sentence encoder were found to be better in terms of speed and hardware constraints (only CPU-based servers were used). As the joint neural network model needs to keep an entire repository of documents in memory during the training and the inference phase, GPUs with large memory would be needed, if transformer-based models were used (added cost). Moreover, the language used in documents like resume or crime articles is different from the text on which BERT is pre-trained. Hence the benefit from transfer learning would not be achieved. When BERT-based entity extraction algorithm for entity extraction was used, comparable accuracy with respect to GloVe based BiLSTM-CRF entity extraction was observed at a lower cost, thereby making GloVe based LSTM sequence autoencoder a preferred option to learn sentence representation for certain documents like resume.

Another type of document where the method and system of the present disclosure may be applied is a news article, wherein a use case may be extraction of a relation mention between entity types Victim, CrimeType, LOC (of the cime) and LossValue for a relation type CRIME.

TABLE 3

Exemplary sentences from an exemplary news article with labels

| Sentences | Labels |
|---|---|
| PUNE: Three old women became soft targets for chain snatchers during the last 24 hours in the city. | O |
| According to the Kothrud police, under whose jurisdiction two of the incidents took place, one [Indira Kulkarni]$_{Victim}$ (73) of [Vaikalya society, Paud road]$_{LOC}$, was climbing the stairs to her flat around 11.30 am on Wednesday, when a man hurriedly went past her to the first floor. | B-Crime |
| He rushed back with the same speed, [snatched her gold chain]$_{CrimeType}$, worth around [Rs 11,000]$_{LossValue}$, and fled with an accomplice who was waiting on a motorcycle. | I-Crime |
| The second citizen, [Sandhya Joshi]$_{Victim}$ (68) of Sukhsagarnagar, was tricked in a similar way. | B-Crime |
| [Joshi]$_{Victim}$, along with her husband, was climbing the stairs to her relatives' flat in [Erandwana]$_{LOC}$ around 10 pm on Tuesday, when an unidentified man came from behind and [snatched her mangalsutra]$_{CrimeType}$ worth around [Rs 10,000]$_{LossValue}$. | I-Crime |
| He fled with an accomplice who was waiting on a scooter. Assistant inspector B. R. Shinde is investigating these cases. | O |
| In the third incident on Tuesday evening, one [Champabai Lunawat]$_{Victim}$ (78) of Puja bungalow, Pradhikaran, Nigdi, was returning home after her evening walk when two men came on a motorcycle and [snatched her chain]$_{CrimeType}$ near [Ruston employees' housing colony]$_{LOC}$. | B-Crime |

Multiple relation mentions of the relation type CRIME can be extracted from a news article (such as shown above in Table 3) reporting multiple crime events. The method and system of the present disclosure can suitably be trained for learning a joint neural network model to extract relation mentions of relation type CRIME from news articles. In the example, the sentence span 2 to 3 corresponds to the following relation mention: CRIME (Indira Kulkarni; snatched her gold chain; Vaikalya Society, Paud Road; Rs. 11,000)

The sentence span 4-5 corresponds to the following relation mention: CRIME (Sandhya Joshi; snatched her mangalsutra; Erandwana; Rs. 10,000) The sentence span 7-7 corresponds to the following relation mention: CRIME (Champabai Lunawat, snatched her chain, Ruston employees' housing colony, NA)

As seen from the description above, the experimental analysis, the examples provided, it is observed that the method and system of the present disclosure facilitate effectively extracting mentions of complex relation types from documents. Although some state-of-the-art approaches have addressed N-ary, cross-sentence relation extraction, they are not applicable to document types such as resume or news article described above. The state-of-the-art does not address partial relation mentions with missing entity arguments (second example in Table 1 above). Also, when a relation mention spans further than two sentences, it becomes complex. Some state-of-the-art approaches identify relations from a sentence one at a time and hence cannot extract cross-sentence relation mentions. Further, document types such as resumes have blank lines, paragraph structure that may not be a standard. Again, the state-of-the-art approaches assume that the gold-standard entity mentions are already available. The joint neural network model of the present disclosure provides an end-to-end solution for extracting entity mentions and identifies relation mentions from the document, although, for clarity, alternative approaches have been described herein above to compare the performance of the joint neural network model. Thus the system and method of the present disclosure, particularly facilitate extracting mentions of complex relation type, even when some entity arguments (non-pivot) are missing and can be implemented for any document that meets the conditions mentioned above in the description.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more hardware processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:
   training, via one or more hardware processors, a joint neural network model including a first Recurrent Neural Network (RNN) layer and a second RNN layer to obtain a trained joint neural network model;
   receiving, via the one or more hardware processors, a test document for extracting mentions including a plurality of entity mentions and a plurality of relation mentions using the trained joint neural network model, wherein the trained joint neural network model includes the first RNN layer and the second RNN layer trained jointly, wherein each relation mention in the plurality of relation mentions is a tuple of two or more entity mentions from the plurality of entity mentions;
   creating, via the one or more hardware processors serving as the first RNN layer, a sentence embedding for each sentence in the test document and predicting the plurality of entity mentions with an associated prediction confidence for each word comprised therein;
   predicting, via the one or more hardware processors serving as the second RNN layer, labels for each sentence in the test document, wherein the labels identify one or more sentence spans, each sentence span corresponding to a relation type between two or more entity types with associated entity mentions from the predicted plurality of entity mentions; and
   extracting, via the one or more hardware processors, a relation mention for an associated relation type, from each of the identified one or more sentence spans by selecting at least one entity mention for each entity type corresponding to the relation type,
   wherein the training the joint neural network model comprises:
   receiving, via the one or more hardware processors, a plurality of training documents of the same type as the test document, a list of entity mentions and a list of sentence spans comprised in each of the plurality of training documents, wherein each sentence span corresponds to a relation mention of a relation type between two or more entity types with associated entity mentions;
   creating, via the one or more hardware processors serving as the first RNN layer, a sentence embedding for each sentence in each of the plurality of training documents, using a sequence of word embeddings of the words comprised therein; and
   jointly training, via the one or more hardware processors, the first RNN layer and the second RNN layer of the joint neural network model, wherein the first RNN layer is trained using the received list of entity mentions to predict one or more entity mentions with an associated prediction confidence for each word in each sentence, and wherein the second layer is trained using the sentence embeddings created by the first RNN layer and the received list of sentence spans to predict a label for each sentence.

2. The processor implemented method of claim 1, wherein selecting at least one entity mention for each entity type corresponding to the relation type is based on a predefined rule.

3. The processor implemented method of claim 2, wherein the predefined rule is one of (i) selecting an entity mention having a highest prediction confidence if there are more than one associated entity mentions for an entity type and the entity type has a single value; (ii) selecting all the entity mentions if there are more than one associated entity mentions for an entity type and the entity type has multiple values; (iii) selecting an entity mention randomly from the entity mentions of an associated entity type; or (iv) selecting an entity mention having a longest argument from the entity mentions of an associated entity type; and wherein the prediction confidence of an entity mention having multiple words is based on a geometric mean of the prediction confidence of the individual words therein.

4. The processor implemented method of claim 1, wherein one or more word embeddings in the sequence of word embeddings, is combined with one or more of (i) a Part-of-speech (POS) embedding, (ii) a contextual sentence embedding and (iii) a Named entity recognition (NER) embedding.

5. The processor implemented method of claim 4, wherein the contextual sentence embedding is obtained by:
   obtaining, via the one or more hardware processors serving as a third RNN layer, a sentence embedding for each sentence in each of the plurality of training documents, using a sequence of word embeddings of the words comprised therein; and creating, via the one or more hardware processors serving as a fourth RNN layer, a contextual sentence embedding for each obtained sentence embedding from the third layer.

6. The processor implemented method of claim 1, wherein the mentions are associated with complex relation types in the test document characterized by one or more of i) a relation having more than two entity mention arguments, ii) a relation having entity mention arguments spanning across two or more sentences, iii) a relation having one or more missing entity mention arguments for a relation mention, and iv) a relation wherein one or more entity mention arguments have more than one values.

7. The processor implemented method of claim 1, wherein the step of extracting a relation mention comprises ignoring a sentence span, from the one or more identified sentence spans, that misses at least one predefined pivot entity mention, wherein each of the at least one predefined pivot entity mention is associated with a predefined pivot entity type and each relation type is associated with at least one predefined pivot entity type.

8. A system comprising:
one or more data storage devices operatively coupled to one or more hardware processors and configured to store instructions configured for execution via the one or more hardware processors serving at least as a first Recurrent Neural Network (RNN) layer, a second RNN layer, a third RNN layer and a fourth RNN layer, to:
train, a joint neural network model including the first RNN layer and the second RNN layer to obtain a trained joint neural network model;
receive, a test document for extracting mentions including a plurality of entity mentions and a plurality of relation mentions using the trained joint neural network model, wherein the trained joint neural network model includes the first RNN layer and the second RNN layer trained jointly, wherein each relation mention in the plurality of relation mentions is a tuple of two or more entity mentions from the plurality of entity mentions;
create, by the first RNN layer, a sentence embedding for each sentence in the test document and predicting the plurality of entity mentions with an associated prediction confidence for each word comprised therein;
predict, by the second RNN layer, labels for each sentence in the test document, wherein the labels identify one or more sentence spans, each sentence span corresponding to a relation type between two or more entity types with associated entity mentions from the predicted plurality of entity mentions; and
extract, a relation mention for an associated relation type, from each of the identified one or more sentence spans by selecting at least one entity mention for each entity type corresponding to the relation type,
wherein the training the joint neural network model comprises:
receiving, a plurality of training documents of the same type as the test document, a list of entity mentions and a list of sentence spans comprised in each of the plurality of training documents, wherein each sentence span corresponds to a relation mention of a relation type between two or more entity types with associated entity mentions;
creating, by the first RNN layer, a sentence embedding for each sentence in each of the plurality of training documents, using a sequence of word embeddings of the words comprised therein; and jointly training the first RNN layer and the second RNN layer of the joint neural network model, wherein the first RNN layer is trained using the received list of entity mentions to predict one or more entity mentions with an associated prediction confidence for each word in each sentence, and wherein the second layer is trained using the sentence embeddings created by the first RNN layer and the received list of sentence spans to predict a label for each sentence.

9. The system of claim 8, wherein the one or more processors are further configured to select at least one entity mention for each entity type corresponding to the relation type based on a predefined rule.

10. The system of claim 9, wherein the predefined rule is one of (i) selecting an entity mention having a highest prediction confidence if there are more than one associated entity mentions for an entity type and the entity type has a single value; (ii) selecting all the entity mentions if there are more than one associated entity mentions for an entity type and the entity type has multiple values; (iii) selecting an entity mention randomly from the entity mentions of an associated entity type; or (iv) selecting an entity mention having a longest argument from the entity mentions of an associated entity type; and wherein the prediction confidence of an entity mention having multiple words is based on a geometric mean of the prediction confidence of the individual words therein.

11. The system of claim 8, wherein the one or more processors are further configured to combine one or more word embeddings in the sequence of word embeddings with one or more of (i) a Part-of-speech (POS) embedding, (ii) a contextual sentence embedding and (iii) a Named entity recognition (NER) embedding.

12. The system of claim 11, wherein the one or more processors are further configured to obtain the contextual sentence embedding by:
obtaining, via the third RNN layer, a sentence embedding for each sentence in each of the plurality of training documents, using a sequence of word embeddings of the words comprised therein; and
creating, via the fourth RNN layer, a contextual sentence embedding for each obtained sentence embedding from the third layer.

13. The system of claim 8, wherein the mentions are associated with complex relation types in the test document characterized by one or more of i) a relation having more than two entity mention arguments, ii) a relation having entity mention arguments spanning across two or more sentences, iii) a relation having one or more missing entity mention arguments for a relation mention, and iv) a relation wherein one or more entity mention arguments have more than one values.

14. The system of claim 8, wherein the one or more processors are further configured to extract the relation mention by ignoring a sentence span, from the one or more identified sentence spans, that misses at least one predefined pivot entity mention, wherein each of the at least one predefined pivot entity mention is associated with a predefined pivot entity type and each relation type is associated with at least one predefined pivot entity type.

15. A computer program product comprising a non-transitory computer readable medium having a computer readable program embodied therein, wherein the computer readable program, when executed on a computing device, causes the computing device to:
training, via one or more hardware processors, a joint neural network model including a first Recurrent Neural Network (RNN) layer and a second RNN layer to obtain a trained joint neural network model;

receiving, via one or more hardware processors, a test document for extracting mentions including a plurality of entity mentions and a plurality of relation mentions using the trained joint neural network model, wherein the trained joint neural network model includes the first RNN layer and the second RNN layer trained jointly, wherein each relation mention in the plurality of relation mentions is a tuple of two or more entity mentions from the plurality of entity mentions;

creating, via the one or more hardware processors serving as the first RNN layer, a sentence embedding for each sentence in the test document and predicting the plurality of entity mentions with an associated prediction confidence for each word comprised therein;

predicting, via the one or more hardware processors serving as the second RNN layer, labels for each sentence in the test document, wherein the labels identify one or more sentence spans, each sentence span corresponding to a relation type between two or more entity types with associated entity mentions from the predicted plurality of entity mentions; and extracting, via the one or more hardware processors, a relation mention for an associated relation type, from each of the identified one or more sentence spans by selecting at least one entity mention for each entity type corresponding to the relation type, wherein the training the joint neural network model comprises:

receiving, via the one or more hardware processors, a plurality of training documents of the same type as the test document, a list of entity mentions and a list of sentence spans comprised in each of the plurality of training documents, wherein each sentence span corresponds to a relation mention of a relation type between two or more entity types with associated entity mentions;

creating, via the one or more hardware processors serving as the first RNN layer, a sentence embedding for each sentence in each of the plurality of training documents, using a sequence of word embeddings of the words comprised therein; and jointly training, via the one or more hardware processors, the first RNN layer and the second RNN layer of the joint neural network model, wherein the first RNN layer is trained using the received list of entity mentions to predict one or more entity mentions with an associated prediction confidence for each word in each sentence, and wherein the second layer is trained using the sentence embeddings created by the first RNN layer and the received list of sentence spans to predict a label for each sentence.

\* \* \* \* \*